US008761002B2

(12) United States Patent
Smith et al.

(10) Patent No.: US 8,761,002 B2
(45) Date of Patent: *Jun. 24, 2014

(54) CONTROLLING MULTICAST SOURCE SELECTION IN AN ANYCAST SOURCE AUDIO/VIDEO NETWORK

(71) Applicant: AT&T Intellectual Property I, LP, Atlanta, GA (US)

(72) Inventors: Donald M. Smith, San Ramon, CA (US); Kuo-Hui Liu, San Ramon, CA (US); Gregory Harp, Allen, TX (US); Thomas Bradley Scholl, New Haven, CT (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/746,602

(22) Filed: Jan. 22, 2013

(65) Prior Publication Data

US 2013/0128719 A1 May 23, 2013

Related U.S. Application Data

(63) Continuation of application No. 11/724,071, filed on Mar. 14, 2007, now Pat. No. 8,385,190.

(51) Int. Cl.
*G01R 31/08* (2006.01)

(52) U.S. Cl.
USPC ........... 370/221; 370/218; 370/225; 370/242; 370/390; 370/396; 370/400; 714/2; 379/272; 709/238

(58) Field of Classification Search
USPC ......... 370/217–218, 221, 225, 242, 244, 390, 370/395.3, 395.32, 396, 400; 714/2, 3, 4.1, 714/4.11, 4.12, 4.2, 4.21, 4.3, 4.4, 4.5; 379/272–277; 709/238–244; 711/221
See application file for complete search history.

(56) References Cited

U.S. PATENT DOCUMENTS

| 6,732,182 B1 | 5/2004 | Beverly |
| 6,785,704 B1 | 8/2004 | McCanne |
| 6,901,445 B2 | 5/2005 | McCanne et al. |
| 6,950,432 B2 | 9/2005 | Chen |

(Continued)

FOREIGN PATENT DOCUMENTS

WO  2008/112512  9/2008

OTHER PUBLICATIONS

International Application Serial No. PCT/US2008/056129, International Search Report and Written Opinion, Jun. 25, 2008, 10 pages.

*Primary Examiner* — Hoon J Chung
(74) *Attorney, Agent, or Firm* — Guntin & Gust, PLC; Douglas Schnabel

(57) ABSTRACT

Particular embodiments of the disclosed subject matter provide methods and systems to support a multicast source selection system. In an example embodiment, the system includes a network element in data communication with a network, the network element being operable to: receive a request for withdrawal of a server as a source of a multicast data stream; and propagate information to the network indicating withdrawal of the server as a source of the multicast data stream, the propagation of information by the network element being responsive to the request for withdrawal of the server as a source of the multicast data stream.

19 Claims, 12 Drawing Sheets

Example of automatic failover operation when a source fails

(56) References Cited

U.S. PATENT DOCUMENTS

| | | |
|---|---|---|
| 7,047,315 B1 | 5/2006 | Srivastava |
| 2001/0037472 A1 | 11/2001 | Li |
| 2005/0195818 A1 | 9/2005 | Hasegawa et al. |
| 2006/0109790 A1 | 5/2006 | Erwin et al. |
| 2006/0117342 A1 | 6/2006 | Park et al. |
| 2006/0233154 A1 | 10/2006 | Eckert et al. |
| 2007/0101379 A1* | 5/2007 | Pereira ............ 725/90 |
| 2007/0189193 A1 | 8/2007 | Previdi et al. |
| 2008/0159141 A1 | 7/2008 | Soukup et al. |

* cited by examiner

Example of Anycast Source operation

Example of automatic failover operation when a source fails

Example of automatic failover operation after link failures

Multicast with source address equal to the interface address of the server

Each server sources two multicast groups, with "/32" static routes configured for the sources during normal operation Each server sources two multicast groups, with aggregated static routes configured for the sources during normal operation

CONTROLLING MULTICAST SOURCE SELECTION IN AN ANYCAST SOURCE AUDIO/VIDEO NETWORK

CROSS-REFERENCE TO RELATED APPLICATIONS

This application is a continuation of U.S. patent application Ser. No. 11/724,071 filed Mar. 14, 2007, which is incorporated herein by reference in its entirety.

FIELD OF THE DISCLOSURE

The disclosed subject matter relates to the field of data packet transmission on a network, and more particularly to systems and methods supporting multicast data packet transmission.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2006-2007, SBC Knowledge Ventures L.P. and/or AT&T Knowledge Ventures, All Rights Reserved.

BACKGROUND OF THE DISCLOSURE

Conventional systems provide the capability for unicast data packet transmission between a specific sender and a specific receiver. Multicast data transmission systems can deliver data packets to multiple consumers from a single source. Multicast data transmission systems can deliver data packets containing the same information to least two receiving entities simultaneously or nearly simultaneously. As such, multicast data transmission systems can provide a higher level of efficiency when the quantity of networked computer users or audio/video content subscribers grows and network bandwidth demands increase. For these reasons, multicast data transmission systems are often used in video applications, for example, where high levels of network efficiency are needed. However, in conventional multicast data transmission systems, the handling of multicast source selection is inefficient. In some cases, it may be desirable to select a multicast source that is closer to the multicast receiver. In other cases, it is necessary to switch from one multicast source to another multicast source, if a multicast source fails. The conventional multicast data transmission systems are unable to efficiently handle these situations.

Thus, a system for controlling multicast source selection in an anycast source audio/video network is needed.

DETAILED DESCRIPTION OF THE DRAWINGS

In the following detailed description, reference is made to the accompanying drawings that form a part hereof, and in which are shown by way of illustration, specific embodiments in which the disclosed subject matter can be practiced. It is understood that other embodiments may be utilized and structural changes may be made without departing from the scope of the disclosed subject matter.

As described further below, according to various example embodiments of the disclosed subject matter described herein, there is provided a system for controlling multicast source selection in an anycast source audio/video network. The system can include a computer program embedded within the memory and executable by the processor, the computer program comprising instructions to implement a system for controlling multicast source selection in an anycast source audio/video network.

In one example embodiment, an Internet Protocol Television (IPTV) network provides an infrastructure for the real-time delivery of video content (or other forms of content) to large numbers of customers/viewers. In an IPTV network, digitized video content is partitioned into data packets that are transported/delivered to customers via the IPTV network. In one example embodiment, an IPTV network implementation uses an IP multicast approach to distribute video streams from a Super Head End Office (SHO) to a Video Hub Office (VHO) and in turn to all the Set Top Boxes (STBs) at customer locations. An example of such an IP multicast network is described below in connection with FIGS. 1-4.

Figure 1:
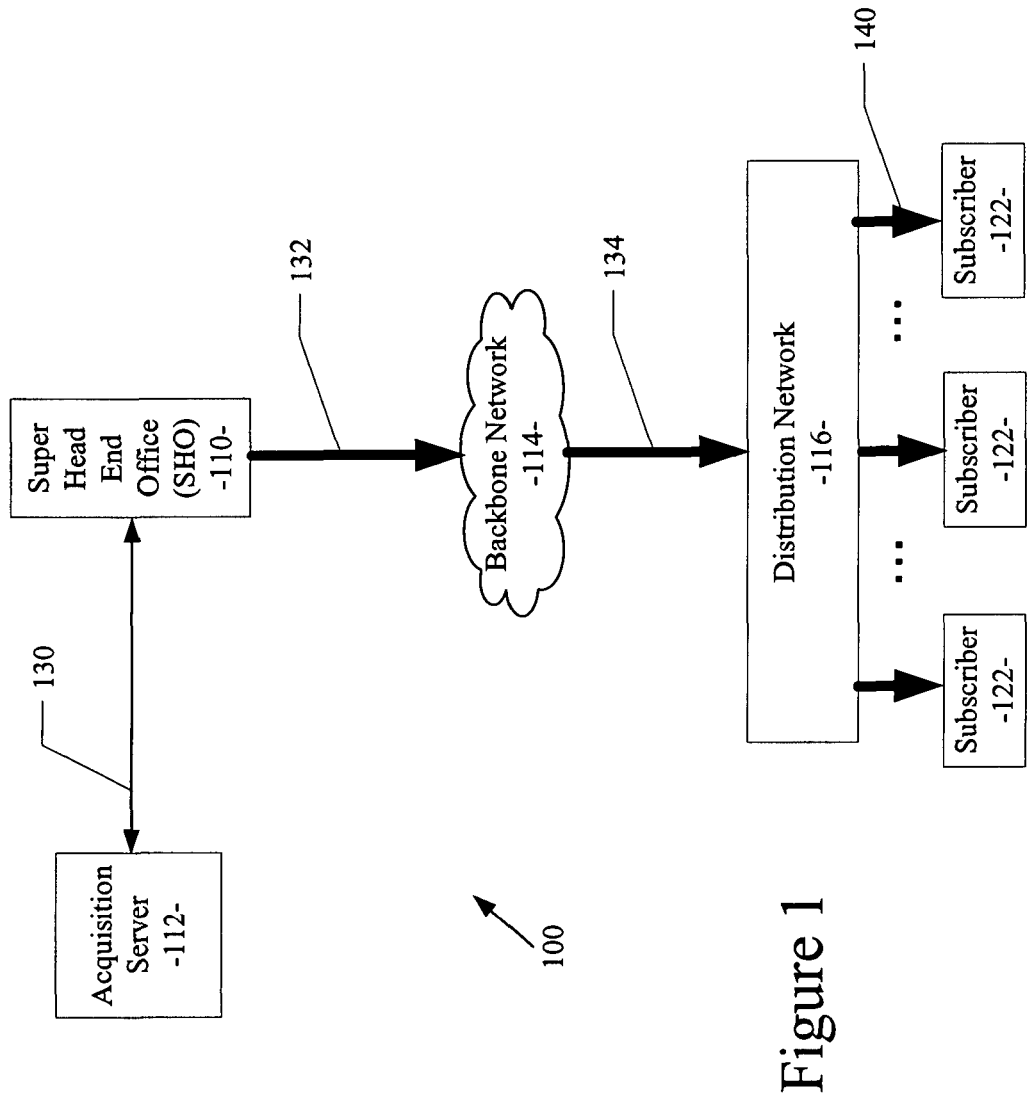
FIG. 1 illustrates an example multicast network architecture in a particular embodiment.

Referring to FIG. 1, a multicast network architecture in a particular embodiment is illustrated. As shown in FIG. 1, the network 100 may include a super head end office (SHO) 110 for acquisition and encoding of video content, for example, received from an acquisition server 112 via a data communication channel 130. SHO 110 can then multicast this video content to a plurality of subscribers 122 via a backbone network 114 and a distribution network 116. It is to be understood that subscribers 122 as used herein refers to a subscriber device for receiving and rendering a content stream. In this example, data streams 132, 134, and 140 are multicast data streams for receipt and consumption by the plurality of subscribers 122. Because of the quantity of subscribers in a desired network, a conventional network, such as backbone network 114, could not handle the bandwidth requirements of a unicast data transmission to each of the subscribers 122. As such, a multicast data transmission of video content to subscribers 122 is necessary. However, if a multicast data transmission source is lost or the data is corrupted in transmission, one or more subscribers 122 may be affected. Therefore, an effective means for controlling multicast source selection and for switching the affected subscribers 122 to a different multicast source is required. This system for controlling multicast source selection is described in more detail below in connection with a particular embodiment. The distribution network 116 in a particular embodiment is also described in more detail below.

Figure 2:
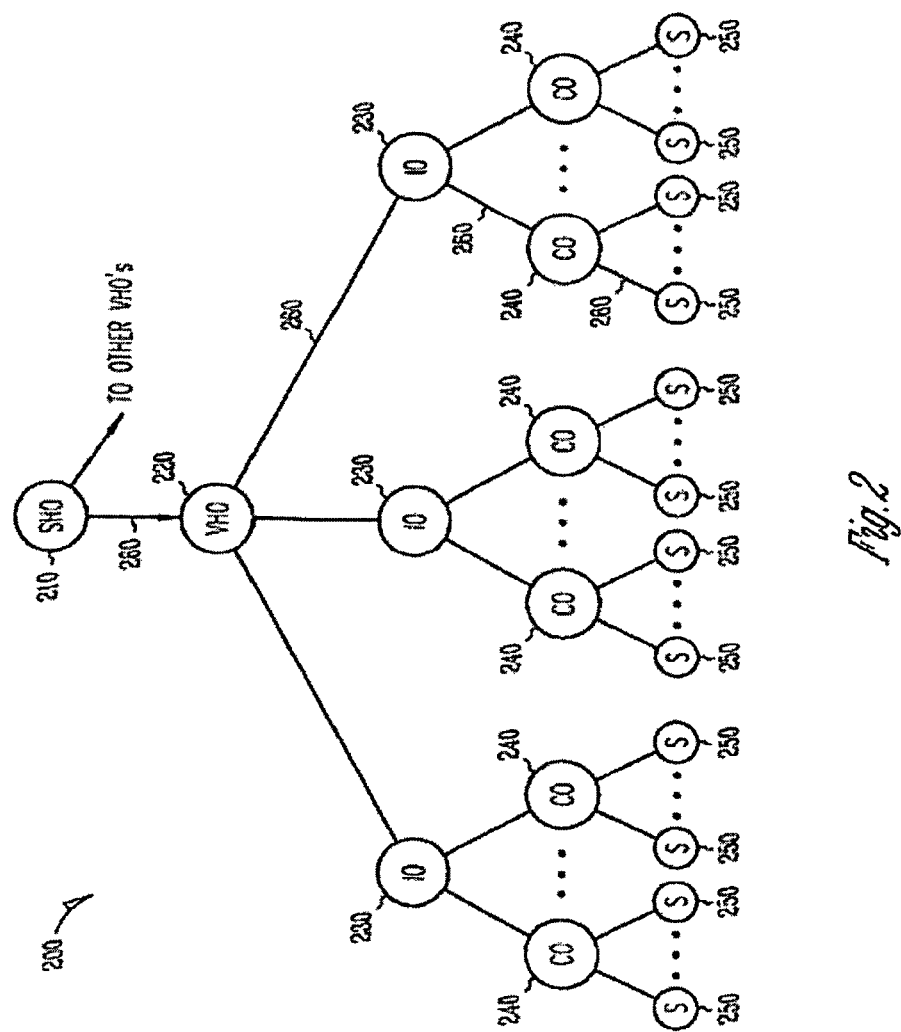
FIGS. 2, 3, and 4 illustrate a video distribution network in accordance with one example embodiment of the disclosed subject matter hereof.
Figure 3:
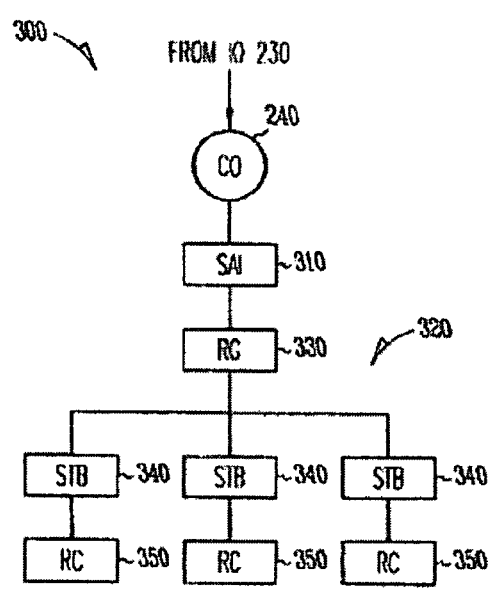
Figure 4:
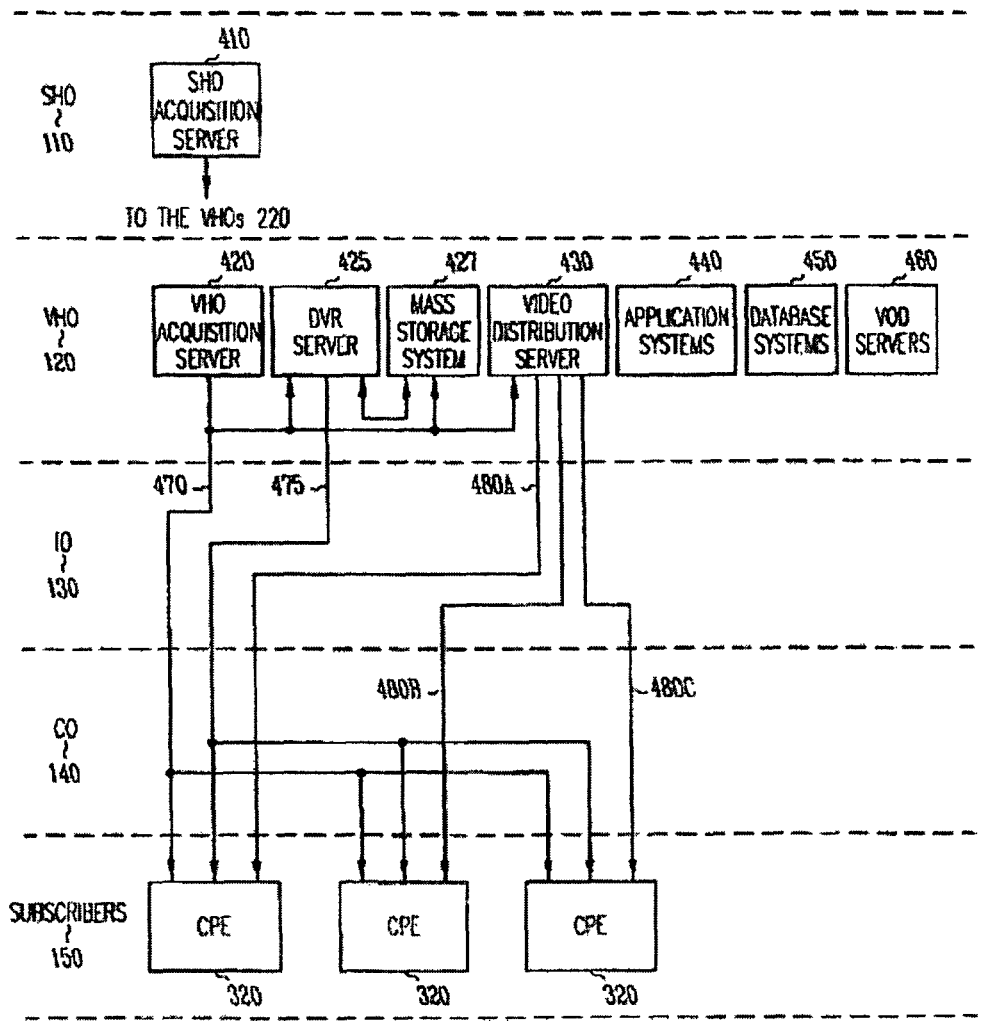

Referring now to FIGS. 2, 3, and 4, there is illustrated one example embodiment of a video distribution system or network 200, using a multicast data packet transmission model. As shown in FIG. 2, the network 200 may include a super head end office (SHO) 210 for acquisition and encoding of video content, one or more video hub offices (VHO) 220 in each demographic market area (DMA), one or more intermediate offices (IO) 230, one or more central offices (CO) 240 located in each metropolitan area, and, finally, the subscribers (S) 250, who may be located in single or multiple dwelling units. In one example embodiment, the network 200 may be connected through a plurality of high speed communication links 260 using physical transport layers such as fiber, cable, twisted pair, air, or other media.

In one example embodiment of the video delivery system, the SHO 210 distributes content to one or more VHOs 220, which may be spread across a wide geographic territory, such as an entire country. The SHO 210 may, for example, be in a central location for acquisition and aggregation of national-level broadcast TV (or linear) programming. A redundant SHO 210 may be provided for backup in case of failure. Linear programming may be received at the SHO 210 via satellite and processed for delivery to the VHO 220. The VHOs 220 are the video distribution points within each demographic market area (DMA) or geographic region.

Referring now to FIG. 3, there is illustrated, in more detail, an example network architecture 300 between the CO 240 and the subscriber 250. A serving area interface (SAI) 310 may be connected to the CO 240. SAI 310 may, for example, be located in a weather-proof enclosure proximate the subscriber 250 premises, and may include fiber-to-the-node (FTTN) equipment. FTTN equipment may also be located in the CO 240. Customer premise equipment (CPE) 320 includes, for example, a network interface device (NID) and a residential gateway (RG) 330, with a built-in very-high-bit-rate digital subscriber loop (VDSL) modem or optical network termination (ONT). In either case, the RG 330 may be connected to the rest of the home set top boxes (STB) 340 via an internal network such as an Ethernet. Each STB 340 has an associated remote control (RC) 350 which provides data entry to the STB 340 to control the broadcast selections from the video distribution data streams.

Referring now to FIG. 4, which illustrates one example embodiment of a configuration according to the disclosed subject matter, a SHO acquisition server 410 may be used to acquire national content that may be distributed towards the VHO 220. In an alternative embodiment, live television content may be acquired using an acquisition server in the VHO 220. In this configuration, the VHO 220 may include a live television acquisition server 420 and a video distribution server 430, which forward the live television and/or other content toward the subscribers 250 through the intermediate offices (IOs) 230 and the central office (CO) 240. A VHO 220 may also include application systems 440, regional subscriber 250 database systems 450, and VOD servers 460. The COs 240 are connected to the IOs 230 to further distribute traffic towards the subscribers 250. Traffic may reach the subscribers 250 at least partially via either fiber to the node (FTTN) or fiber to the premises (FTTP), or by other types of transmission medium.

As also illustrated in FIG. 4, acquisition server 420 may distribute a plurality of live television programs, each typically associated with a television "channel," using a multicast IP protocol data stream 470 through the IOs 230 and COs 240 to the subscribers 250. The routers, switches, and other network elements that would normally be present in the IOs 230 and COs 240 are not shown in FIG. 4 in order to simplify the drawing. The number of programs or channels sent using multicast may, without limitation, range up to 800 channels or more using present technology, with it being understood that advances in technology may allow many more channels to be sent.

The multicast protocol allows for efficient distribution of these signals to a large number of end subscribers 250. In addition, the video distribution server 430 receives the multicast data stream 470, and distributes selected ones of the live television signals, extracted from the stream 470, using a unicast data stream 480a, 480b, or 480c, to specific subscribers 250. In this embodiment, video distribution server 430 may provide a unicast stream, for example in burst mode, of a specific live television channel to any of the subscribers 250 served by the VHO 220. The burst mode instant channel change data stream can be discontinued once the subscriber's 250 system is loaded with enough TV program data so that the multicast stream can "catch up" and take over supplying the program data stream in the multicast mode for more extended term viewing by the subscriber 250.

According to one embodiment, access to regularly scheduled programming on the television channels may be controlled by a STB 340 in the subscriber 250's premises. Thus, in one example embodiment, each subscriber 250 receives live television programs from the video acquisition server 420 based on IP-based multicasting services, while the video distribution servers 430 can be used to provide subscribers 250 "instant" channel change and recover some video packet losses to maintain acceptable quality of service. Further, the DVR server 425 can be included to provide recorded television programming upon demand by the subscribers 250.

Although the system and method as described above is shown in an example form implemented in a video distribution system, the disclosed system and method may, in another example embodiment, be implemented in a cable television system, in a broadcast television system, in a satellite distribution system, in a wireless distribution system, or in other data packet distribution systems.

Anycast is a conventional network addressing and routing scheme whereby data is routed to the "nearest" or "best" destination as viewed by the routing topology. The term is intended to echo the terms unicast, broadcast and multicast. In unicast, there is a one-to-one association between the network source address and the network destination endpoint; each source address uniquely identifies a single destination endpoint. In broadcast and multicast, there is a one-to-many association between network source addresses and network destination endpoints; each source address identifies a set of destination endpoints, to which all information is replicated. In anycast, there is also a one-to-many association between network source addresses and network destination endpoints; each source address identifies a set of destination endpoints, but only one of the destination endpoints is chosen at any given time to receive information from any given source address.

On the Internet, anycast is usually implemented by using Border Gateway Protocol (BGP) to simultaneously announce the same destination IP address range from many different places on the Internet. This results in packets addressed to destination addresses in this range being routed to the "nearest" point on the net announcing the given destination IP address.

The conventional Anycast network addressing and routing scheme is best suited to connectionless protocols, generally built on User Datagram Protocol (UDP), rather than connection-oriented protocols such as TCP, or UDP-based protocols that keep their own state. This is because the receiver selected for any given source may change from time to time as optimal routes change, thereby silently breaking any conversations that may be in progress at the time.

Figure 5:
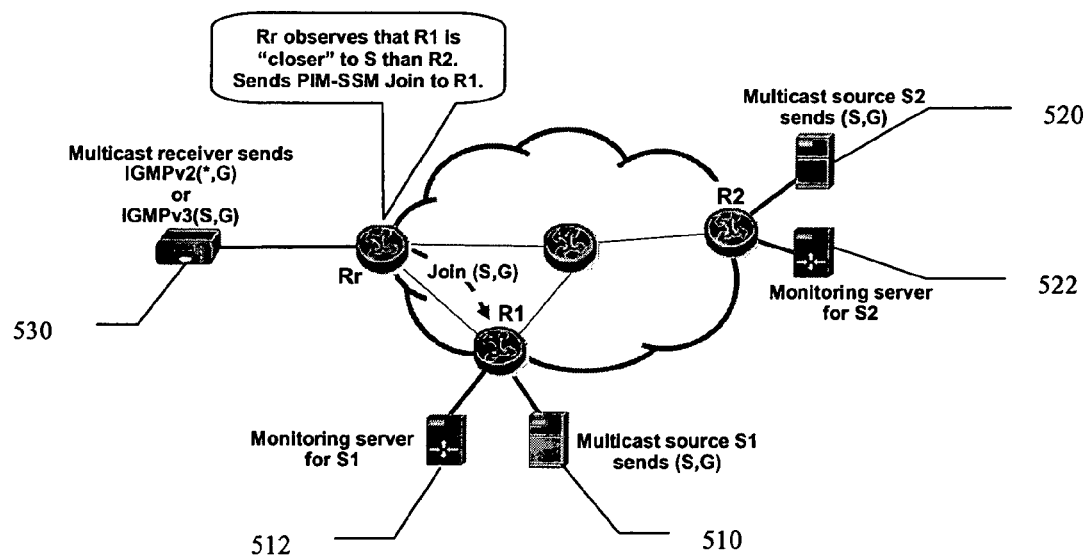
FIGS. 5-10 illustrate a system for controlling multicast source selection in accordance with various example embodiments of the disclosed subject matter hereof.

An example of the basic operation of a multicast or anycast network is shown in FIG. 5, in which there are two multicast sources, S1 510 and S2 520), connected to corresponding routers, or other network elements, R1 and R2. Static routes for S1 and S2 are configured on R1 and R2 respectively, and are propagated to the other routers by unicast routing, for example. Each source (e.g. S1 and S2) sends a multicast stream (S,G), where S is the source address for the multicast group address G. There is a corresponding monitoring server 512 and 522 for each multicast source. The multicast receiver 530 may send an IGMPv2(*,G) message to router Rr to request reception of the data associated with multicast group G. The Internet Group Management Protocol (IGMP) is a conventional communications protocol used to manage the membership of Internet Protocol (IP) multicast groups. IGMP is used by IP hosts and adjacent multicast routers to establish multicast group memberships. In this case, Rr is configured to associate multicast group G with source address S. This allows Rr to send a conventional Protocol Independent Multicast Source Specific Multicast (PIM-SSM) message associated with the multicast stream. In conventional SSM, an IP datagram is transmitted by a source S to an SSM destination address group G, and receivers can receive this datagram by subscribing to multicast stream (S,G). In the example of FIG. 5, Rr can send a conventional PIM-SSM Join or Prune message, as necessary, associated with multicast stream (S,G). Alternatively, the multicast receiver 530 may send IGMPv3(S,G), in which case Rr does not need to supply the source S for group G.

There is a monitoring and failover control server 512 and 522 in each source location as shown in the example of FIG. 5. This server (512 and 522) monitors the multicast stream from the local multicast source (S1 510 or S2 520) in order to determine the state of the multicast stream. If the stream fails, a control function of the server (512 or 522) executes actions that result in the multicast receiver 530 automatically obtaining the multicast stream for the same (S,G) from the source at the other location. Each monitoring server (512 or 522) sends IGMPv2(*,G) messages to its router (R1 or R2) in order to request reception of the stream from the source (S1 510 or S2 520) attached to its router (R1 or R2, respectively), then monitors the received multicast stream. The monitoring server's router (R1 or R2) is not configured to associate group G with the source address. This prevents the router (R1 or R2) from sending a PIM-SSM Join message toward the multicast source in the other location when the link to the local source fails.

The monitoring and control server (512 or 522) can also obtain information on the state of the multicast streams by receiving messages from the management systems of the multicast sources, or from any elements or their management systems that may exist upstream from the multicast sources. This information as well as the monitoring and control server's locally determined stream state information can all be used to determine if and when failover should be triggered.

Source selection is determined by PIM-SSM, which relies on unicast routing protocol information to build multicast trees toward the multicast source. Therefore, controlling the unicast routing information is one key to controlling source selection.

The example of FIG. 5 shows two multicast sources (S1 510 and S2 520) and one multicast receiver 530. The same principles apply when there are multiple multicast receivers at various locations, and when there are more than two multicast sources for each G at various locations around the network, provided those sources use the same multicast source address.

In the example of FIG. 5, both sources (S1 510 and S2 520) are assumed to be operating normally. Routers R1 and R2 advertise the operability and reachability to their corresponding multicast sources (S1 510 and S2 520, respectively) via the conventional unicast routing protocol. Router Rr learns that the same source address S is reachable via R1 and R2, but for the sake of illustration in this example, the cost to reach R1 is lower than that for R2; so a PIM-SSM Join message is sent toward R1 to build the multicast tree for G.

Figure 6:
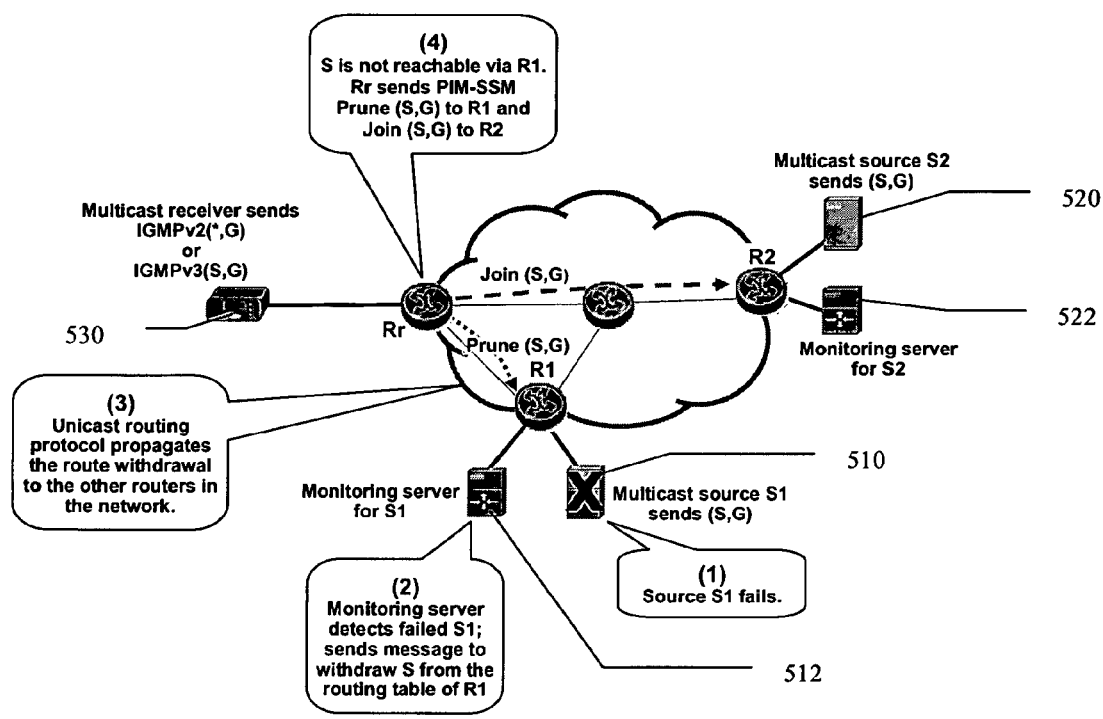

FIG. 6 illustrates one implementation of automatic failover from the failed source S1 510 to source S2 520 for the multicast group G. In the example of FIG. 6, the multicast source S1 510 has failed, while S2 520 is operating normally. The monitoring server 512 for source S1 510 detects the failure of the stream from S1 510 and sends a message to withdraw the route for S from R1. The withdrawal is propagated to the other routers in the network via the conventional unicast routing protocol. Router Rr observes that S is no longer reachable via R1 but is reachable via R2; so router Rr sends a PIM-SSM Prune (S,G) message toward router R1 and a Join (S,G) message toward router R2. Subsequently, router Rr will receive the multicast stream from source S2 520 and forward the multicast stream to the receiver 530.

In an alternative embodiment, source S1 510 could send a message directly to router R1 to withdraw the route (e.g. via a Command Line Interface), or source S1 510 could send a message to the management system of router R1, if such a system is available.

The failover mechanism described above is based on withdrawing the route of a failed multicast source. An alternative failover mechanism is based on adding a more specific route for a normally operating source. Both of these mechanisms are described in more detail below.

Figure 7:
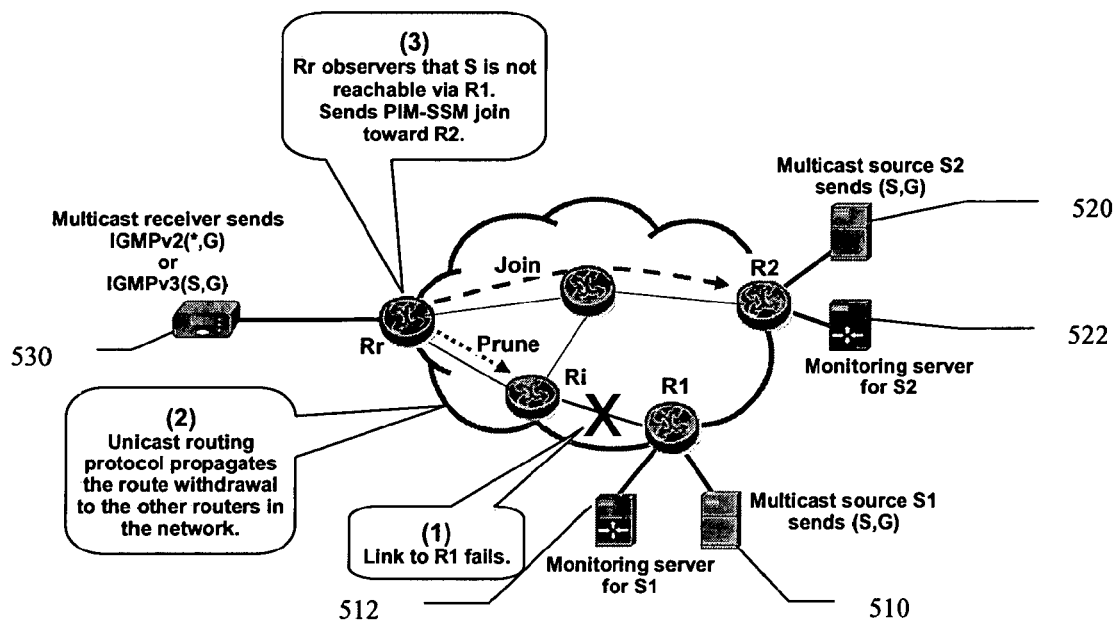

FIG. 7 illustrates automatic failover from source S1 510 to source S2 520 due to a failure inside the router network. In this example, the link from router R1 to its next hop router (Ri) toward router Rr has failed, although the source S1 510 may be operating normally.

The link failure, in this example, is detected by Ri, and the unicast routing protocol propagates the resulting routing update to the other routers in the network. Router Rr observes that S is no longer reachable via router R1; but S is reachable via router R2. Thus, router Rr sends a PIM-SSM Prune (S,G) message toward router R1 and a Join (S,G) message toward router R2. Subsequently, router Rr and its receiver 530 will receive the multicast stream from S2. Note that a failure of router R1 would result in a similar failover as described for FIG. 7.

Figure 8:
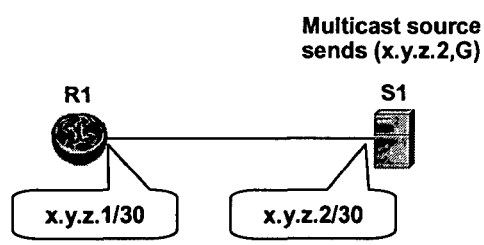

Alternatives for Configuring the Routes of Multicast Sources and Controlling Failover In one alternative embodiment, the multicast source is directly connected to the router, and the multicast source address is the same as the interface address of the source server. An example of this embodiment is shown in FIG. 8. In order to withdraw the route of the source as part of the Anycast Source failover procedure, the router's interface toward the source is shut down.

If the multicast source is the source of two or more groups, the source addresses of the groups are the same, and shutting down the interface on the router would result in failover of all of those groups. If failing over each group individually, independent of the others, is required, then one approach is to configure multicast source addresses that are separate from the server's interface address. In this case, static routes for the sources are configured on the router, with the next hop set to the interface of the multicast source server. In this situation, there are two approaches to configuring the static routes and controlling failover.

Figure 9:
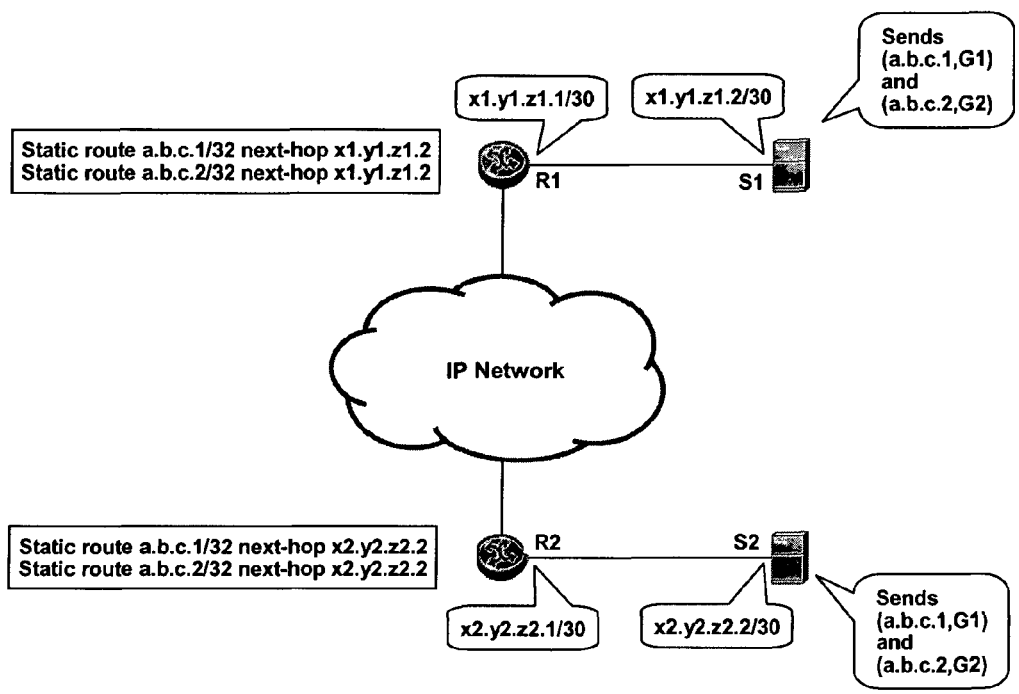

One approach, illustrated in FIG. 9, is to configure a specific route for each multicast source in each location, and have those routes propagated to the other routers in the network. For example, each source could be assigned a host ("/32") route. Suppose for sake of simplifying the description that there are two sources in different locations for a particular group. In normal operation, both of those sources have an associated /32 route, and the source selected by PIM is the one with the lowest cost path to reach it. In order to force selection of a particular source at a particular location for the group, the /32 route for the source at the other location is withdrawn and the withdrawal is propagated to all the relevant routers. As a result, the desired source (i.e. the non-withdrawn source) is the only one known to be reachable by unicast routing, so the desired source will be selected.

As shown in FIG. 9, to failover G1 from S1 to S2, the "static route a.b.c.1/32 next-hop x1.y1.z1.2" is withdrawn from R1. This approach can be extended to more than two groups per server, with servers at more than two locations. In order to force selection of the source of a particular group at one location, the /32 routes for all the corresponding sources at the other locations would be withdrawn. Note that if the router supports it, an alternative is to configure the next-hop to be an identifier of the router's interface toward the multicast source.

Figure 10:
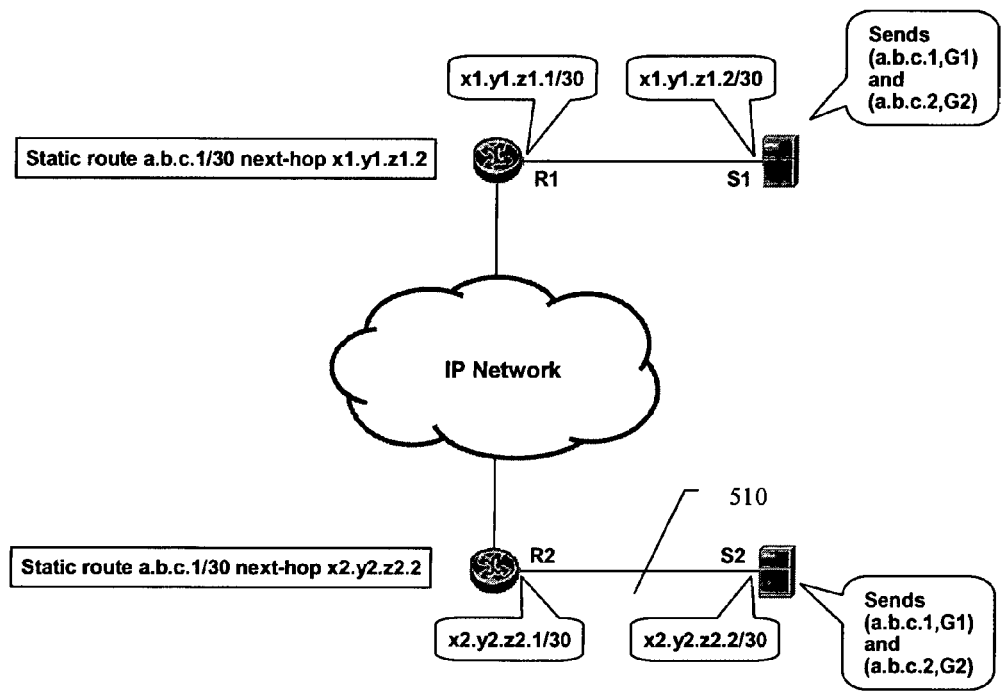

Another approach, as shown in FIG. 10, is to configure an aggregated route that includes the multicast sources and have the aggregated route advertised by the routers at each location. In this example, there are two groups (G's) per server, and the aggregated route is a "/30", for example. This approach is easily extended to a larger number of G's per server by changing the value of the mask. Suppose for the sake of simplifying the description that there are two sources S1 and S2 at different locations for a particular group. In normal operation, the multicast sources S1 and S2 are represented by an associated aggregated route, and the source selected by PIM is the one with the lower cost path to reach the source. In order to force selection of a particular source at a particular location, a more specific route, a /32, is advertised for that source at that location. This results in the unicast routing protocol choosing that location; because, the route to that source is a longer match (i.e. a more specific match) than the aggregated route of the other location. This approach can be directly applied when there are two or more source servers at different locations for a particular group.

As shown in FIG. 10, to failover G1 from source S1 to source S2, add "static route a.b.c.1/32 next-hop x2.y2.z2.2" to router R2. Note that if the router supports it, an alternative to configuring a static "aggregated" route is to configure a secondary address on the router's interface toward the multicast source server. The other aspects of the failover mechanism would be the same as described above. FIG. 10 shows the configuration of an example embodiment when everything is operating normally (i.e. when there are no failures). As such, the /30 mask is shown as configured for both locations, R1 and R2. As described above, the /32 mask is configured when it's necessary to cause a failover from one source location to another source location (e.g. from S1 and R1 to S2 and R2). In this failover case, because a more specific route, a /32, is advertised for that source at that location, the routing protocol will choose that location (i.e. S2 and R2 in this example).

Automatic and Manually Controlled Failover

Automatic failover due to source failure is based on monitoring and control servers which determine the state of the multicast streams. When stream failure is detected, failover procedures involving maintenance of routing data are performed, as described above. Failover could also occur automatically as a result of link or node failures in the IP network, and this could be independent of the state of the multicast streams.

Manually controlled failover refers to failover initiated "on demand" by operations personnel. Manually controlled failover procedures can be implemented within the operations systems, whereby those systems communicate with the management systems of the multicast source routers in order to perform the route maintenance procedures described above.

Figure 11:
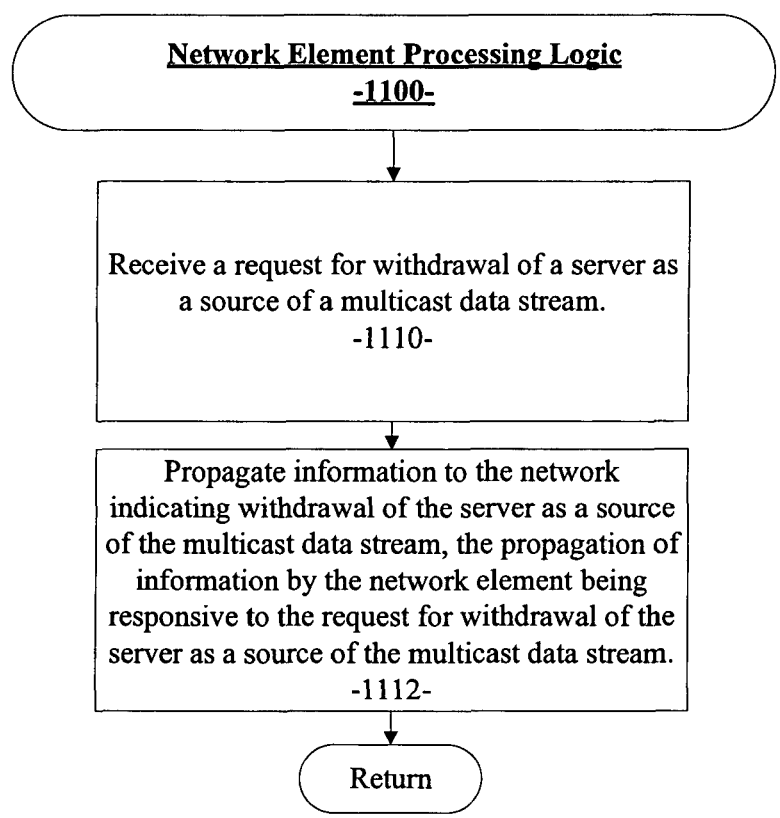
FIG. 11 is a processing flow diagram illustrating an example of the various methods related to example embodiments in accordance with the disclosed subject matter.

FIG. 11 is a processing flow diagram illustrating an example of the various methods related to example embodiments in accordance with the disclosed subject matter.

Figure 12:
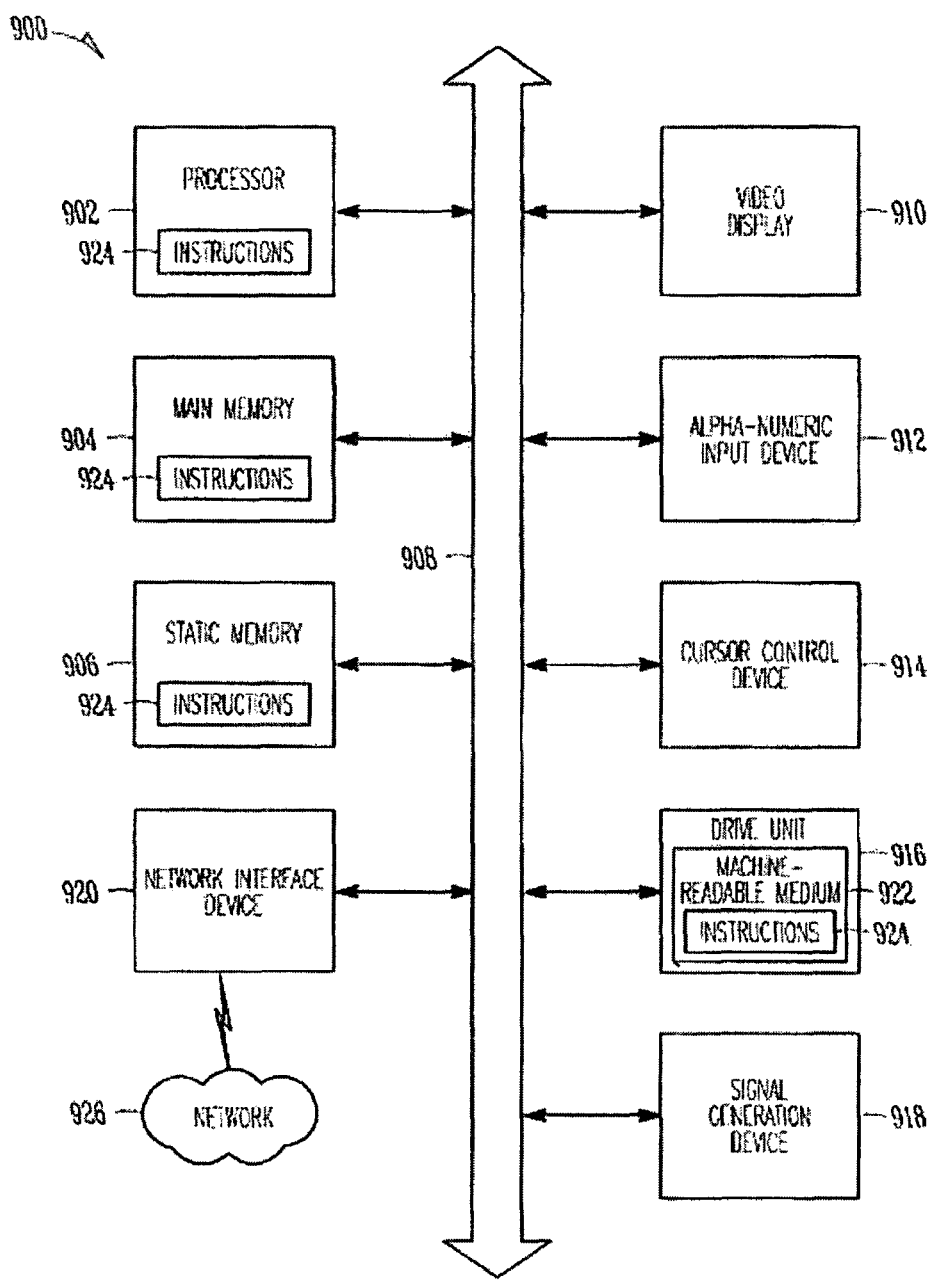
FIG. 12 illustrates an example computer system.

Referring now to FIG. 12, a diagrammatic representation of a machine is shown in the example form of a computer system 900 of a type sufficient for use in any of the example embodiments set forth herein. System 900 may include a set of instructions for causing the machine to perform any one or more of the methodologies discussed herein, that may be executed. In alternative embodiments, the machine operates as a standalone device or may be connected (e.g., networked) to other machines. In a networked deployment, the machine may operate in the capacity of a server, a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904, and/or within the processor 902, during execution thereof by the computer system 900. The main memory 904 and the processor 902 may also constitute machine-readable media.

The software 924 may further be transmitted or received over a network 926 via the network interface device 920 utilizing any one of a number of well-known transfer protocols, for example, the hyper text transfer protocol (HTTP). While the machine-readable medium 922 is shown in an example embodiment to be a single medium, the term "machine-readable medium" as an article of manufacture should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the disclosed subject matter, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure and methods described herein, a multicast data packet recovery system is described. In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of ordinary skill in the art upon reviewing the description.

The Abstract of the Disclosure is provided to comply with 37 C.F.R. .sctn. 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A network device, comprising:
a memory to store computer instructions; and
a processor coupled to the memory, wherein the processor, responsive to executing the computer instructions, performs operations comprising:
monitoring a multicast data stream being transmitted by a first server through a group of routers including a first router, wherein the server is a source of the multicast data stream and wherein the monitoring by the network device is by directly receiving the multicast data stream from the first router and not directly from the server;
transmitting a first request to receive the multicast data stream to the first router;
detecting a failure of the server to transmit the multicast data stream based on the monitoring of the multicast data stream;
receiving a second request to withdraw the server as the source of the multicast data stream; and
propagating information to the group of routers via unicasting indicating withdrawal of the server as the source of the multicast data stream responsive to detecting the failure of the server to transmit the multicast data stream or responsive to receiving the second request to withdraw the server as the source of the multicast data stream.

2. The network device of claim 1, wherein the multicast data stream is associated with a multicast group and a source address, and wherein the first router is not configured to associate the multicast group with the source address.

3. The network device of claim 1, wherein a second router of the group of routers of a multicast group transmits a request to unsubscribe from a second multicast group responsive to the propagating of the information.

4. The network device of claim 1, wherein a second router of the group of routers of a multicast group transmits a third request to subscribe to a second multicast group associated with the multicast data stream responsive to the propagating of the information.

5. The network device as claimed in claim 1, wherein a second router of the group of configures a specific route for each of a plurality of multicast sources responsive to the propagating of the information.

6. The network device as claimed in claim 1, wherein a second router of the group of configures an aggregated route that includes each of a plurality of multicast sources responsive to the propagating of the information.

7. A method, comprising:
receiving, by a system comprising a processor, a first request for withdrawal of a server as a source of a multicast data stream, wherein the first request for withdrawal is responsive to detecting a failure of the server to transmit the multicast data stream, wherein the detecting of the failure is performed by a network device that receives the multicast data stream directly from a first router in communication with the server without directly receiving the multicast data stream from the server;
propagating, by the system, information to a network indicating withdrawal of the server as the source of the multicast data stream, wherein the propagating of the information is affirmatively responsive to receiving the request for withdrawal of the server as the source of the multicast data stream; and
transmitting, by the system, a second request to receive the multicast data stream to the first router, wherein the multicast data stream is associated with a source address.

8. The method of claim 7, further comprising detecting a failure of the server if the multicast data stream is not being transmitted by the server.

9. The method of claim 8, wherein the propagating of the information is further affirmatively responsive to detecting the failure of the server.

10. The method of claim 7, wherein a second router of a multicast group transmits a third request to unsubscribe from a second multicast group responsive to the propagating of the information.

11. The method of claim 7, wherein a second router transmits a third request to subscribe to a multicast group associated with the multicast data stream responsive to the propagating of the information.

12. The method of claim 7, wherein the server is directly coupled to the first router.

13. The method of claim 7, further comprising configuring a specific route for each of a plurality of multicast sources responsive to the propagating of the information.

14. A computer-readable storage device, comprising instructions that, when executed by a processor, facilitate performance of operations comprising:
monitoring a multicast data stream being transmitted by a first server through a group of routers including a first router, wherein the server is a source of the multicast data stream and wherein the monitoring is by directly receiving the multicast data stream from the first router and not directly from the server;
transmitting a first request to receive the multicast data stream to the first router;
detecting a failure of the server to transmit the multicast data stream based on the monitoring of the multicast data stream;
receiving a second request to withdraw the server as the source of the multicast data stream; and
propagating information to the group of routers via unicasting indicating withdrawal of the server as the source of the multicast data stream responsive to detecting the failure of the server to transmit the multicast data stream or responsive to receiving the second request to withdraw the server as the source of the multicast data stream.

15. The computer-readable storage device of claim 14, wherein the multicast data stream is associated with a multicast group and a source address, and wherein the first router is not configured to associate the multicast group with the source address.

16. The computer-readable storage device of claim 14, wherein a second router of the group of routers of a multicast group transmits a request to unsubscribe from a second multicast group responsive to the propagating of the information.

17. The computer-readable storage device of claim 14, wherein a second router of the group of routers of a multicast group transmits a third request to subscribe to a second multicast group associated with the multicast data stream responsive to the propagating of the information.

18. The computer-readable storage device as claimed in claim 14, wherein a second router of the group of configures a specific route for each of a plurality of multicast sources responsive to the propagating of the information.

19. The network device as claimed in claim 1, wherein a second router of the group of configures an aggregated route that includes each of a plurality of multicast sources responsive to the propagating of the information.

\* \* \* \* \*